United States Patent
Holden (10) Patent No.: US 12,122,647 B2
(45) Date of Patent: Oct. 22, 2024

(54) WEAR PAD ASSEMBLY AND METHOD FOR ADJUSTING

(71) Applicant: Caterpillar Inc., Peoria, IL (US)

(72) Inventor: Robin Jonathan Holden, Rothley (GB)

(73) Assignee: Caterpillar Inc., Peoria, IL (US)

( * ) Notice: Subject to any disclaimer, the term of this patent is extended or adjusted under 35 U.S.C. 154(b) by 139 days.

(21) Appl. No.: 17/884,814

(22) Filed: Aug. 10, 2022

(65) Prior Publication Data

US 2023/0183045 A1 Jun. 15, 2023

(30) Foreign Application Priority Data

Aug. 13, 2021 (GB) ...................................... 2111680

(51) Int. Cl.
*B66C 23/70* (2006.01)
*E02F 3/30* (2006.01)
(Continued)

(52) U.S. Cl.
CPC ............ *B66C 23/707* (2013.01); *E02F 3/306* (2013.01); *E02F 3/38* (2013.01); *F16C 17/04* (2013.01); *F16C 29/02* (2013.01)

(58) Field of Classification Search
CPC ........ F16C 29/001; F16C 29/02; F16C 29/12; F16C 35/077; F16C 35/22; B66C 23/707; E02F 9/285
See application file for complete search history.

(56) References Cited

U.S. PATENT DOCUMENTS 4,505,628 A * 3/1985 Meibuhr ................. F16B 39/10
411/315
4,917,511 A * 4/1990 Katsube ................ F16C 35/077
384/585
(Continued)

FOREIGN PATENT DOCUMENTS

CN 202297059 7/2012
CN 104482025 4/2015
(Continued)

OTHER PUBLICATIONS

Great Britain Search Report related to Application No. 2111680.1; reported on Jan. 25, 2022.
(Continued)

*Primary Examiner* — Alan B Waits (57) ABSTRACT

The present invention pertains to a wear pad assembly for adjusting a position of a wear pad in a telescopic boom of a work machine, comprising a threaded boss, a threaded bolt configured for threaded engagement with the threaded boss and a wear pad connectable to the threaded bolt. The wear pad assembly further comprises locking means configured to lock the threaded boss and the threaded bolt in a first engagement position and at least a further engagement position. The present invention further pertains to a method of adjusting such a wear pad assembly, the wear pad assembly being mounted to a first telescopic boom segment such that the wear pad provides a sliding surface for a second telescopic boom segment, the method comprising the steps of unlocking the threaded bolt by disassembling at least a part of the locking means, rotating the threaded bolt from the first engagement position into the further engagement position, and locking the threaded bolt in the further engagement position by reassembling the disassembled
(Continued)

locking means when the threaded bolt is in the further engagement position.

13 Claims, 6 Drawing Sheets

(51) Int. Cl.
    *E02F 3/38*    (2006.01)
    *F16C 17/04*   (2006.01)
    *F16C 29/02*   (2006.01)

(56) References Cited

U.S. PATENT DOCUMENTS

| | | |
|---|---|---|
| 7,293,377 B2 | 11/2007 | Pinther, II et al. |
| 8,955,331 B2 | 2/2015 | Moehrle et al. |
| 9,950,911 B2 | 4/2018 | Fortunato et al. |
| 10,066,363 B1* | 9/2018 | McGee, Jr. ............ F16C 33/26 |
| 10,662,035 B2 | 5/2020 | Cunningham |
| 2002/0145278 A1* | 10/2002 | Hulse ................... E02F 9/085 |
| | | 280/763.1 |
| 2009/0245969 A1* | 10/2009 | White ................... F16C 25/06 |
| | | 411/215 |
| 2010/0301665 A1* | 12/2010 | White ................... F16C 25/06 |
| | | 301/105.1 |

FOREIGN PATENT DOCUMENTS

| | | |
|---|---|---|
| EP | 1243706 | 9/2002 |
| EP | 2789770 | 10/2014 |
| GB | 1593057 A | 7/1981 |
| GB | 2392663 A | 3/2004 |
| GB | 2452851 A | 3/2009 |
| IT | 201800004289 | 10/2019 |
| WO | 2016061612 | 4/2016 |

OTHER PUBLICATIONS

European Extended Search Report for EP application 22187444.9 mailed Jan. 5, 2023 (6 pgs).

* cited by examiner

WEAR PAD ASSEMBLY AND METHOD FOR ADJUSTING

CROSS-REFERENCE TO RELATED APPLICATION

This application claims priority under 35 USC 8119 and the Paris Convention to Great Britain Patent Application No. 2111680.1 filed on Aug. 13, 2021.

TECHNICAL FIELD

The present invention pertains to a wear pad assembly for adjusting a position of a wear pad in a telescopic boom of a work machine, comprising a threaded boss, a threaded bolt configured to threaded engagement with the threaded boss and a wear pad connectable to the threaded boss. The present invention further pertains to a method for adjusting such wear pad assembly, the wear pad assembly being mounted to a first telescopic boom segment such that the wear pad provides a sliding surface for a second telescopic boom segment.

TECHNOLOGICAL BACKGROUND

Telescopic boom assemblies are employed in work machines such as telehandlers, excavators and backhoe loaders. Telescopic boom assemblies usually comprise boxlike boom sections and wear pads mounted therein to allow smooth extension and retraction of the boom sections relative to each other. Hereto, a wear pad provides a sliding surface along which a running or sliding surface of a telescopic boom assembly slides.

A further important task of such wear pads is holding individual telescopic boom segments in place and transporting loads acting on one telescopic boom segment to another telescopic boom segment.

When showing a predetermined amount of wear, wear pads are usually replaced as wear inherently leads to free play, or slop, between the boom sections. Since telescopic booms usually comprise a large amount of wear pads, wear pad replacement intervals of telescopic booms and associated costs have become key performance indicators in the market of work machines.

Some approaches are known from the state of the art suggest using adjustable wear pad assemblies for adjusting the position of a wear pad relative to a running surface of a boom segment to achieve longer maintenance intervals.

U.S. Pat. No. 10,662,035 B2 suggests adjustable wear pad buttons which comprise a wear pad that is screwed into the boom until it bears against a running surface of an inner boom member. To hold the wear pad button in position, a collet insert is forced into and secured inside a collet socket. However, adjusting the wear pad requires extensive force and several work steps. Further, due to the many interfaces present, it seems essential to provide a clean environment during each adjustment procedure.

US 2002/0145278 A1 suggests an adjustable wear pad which is screwed into a telescopic stabilizer leg. The adjustable wear pad comprises a nylon plug between an inner and an outer thread. The plug increases friction to such an extent that an unintentional displacement of the wear pad can be excluded. This approach has the disadvantage that it is only applicable in small work machines with small loads traveling through the wear pad. As mentioned in the introduction above, load acceptance is an essential task of a wear pad in a telescopic boom. For work machines having telescopic booms with high loads, locking a wear pad by increased friction is not feasible.

The wear pad assembly and the method of adjusting a wear pad assembly of the present disclosure solve one or more problems set forth above.

SUMMARY OF THE INVENTION

Starting from the prior art, it is an objective to provide a reliable yet simple, cost-effective wear-pad assembly for adjusting a position of the wear pad in a telescopic boom of a work machine that allows convenient adjusting of the wear pad.

This objective is solved by means of a wear pad assembly for adjusting a position of a wear pad in a telescopic boom of a work machine with the features of claim 1 and a method for adjusting such a wear pad assembly with the features of claim 16. Preferred embodiments are set forth in the present specification, the Figures as well as the dependent claims.

Accordingly, a wear pad assembly for adjusting a position of the wear pad in a telescopic boom of a work machine is provided, comprising a threaded boss, a threaded bolt configured for threaded engagement with the threaded boss in a wear pad connectable to the threaded bolt. Further, locking means are comprised configured to lock the threaded boss and the threaded bolt in a first engagement position and at least a further engagement position.

Furthermore, a method for adjusting a wear pad assembly is provided, the wear pad being mounted to a first telescopic boom segment such that the wear pad provides a sliding surface for a second telescopic boom segment. The method comprises the steps of unlocking the threaded bolt by disassembling at least a part of the locking means, rotating the threaded bolt from the first engagement position into the further engagement position and locking the threaded bolt in the further engagement position by reassembling the disassembled locking means in the further engagement position.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

Thereto, the present invention and its underlying principles are explained exemplary by one embodiment of a wear pad assembly for adjusting a position of a wear pad in a telescopic boom of a work machine.

Figure 1:
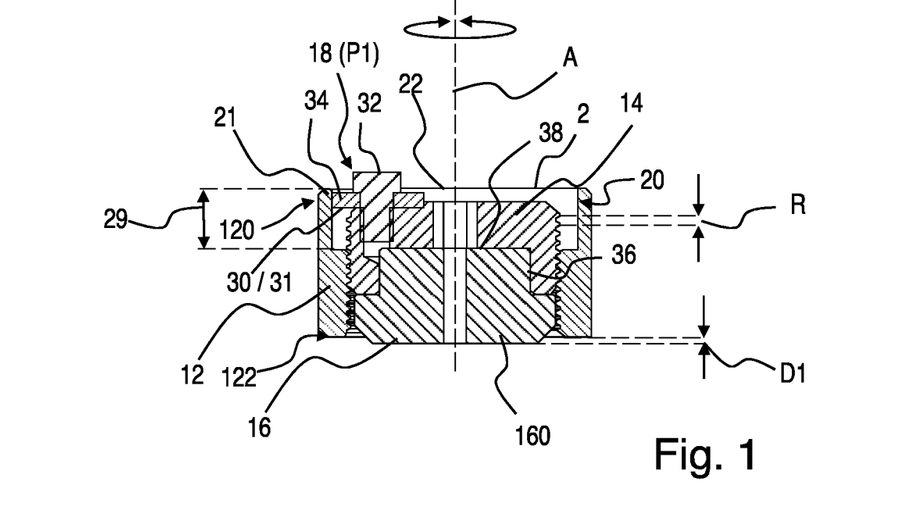
FIG. 1 schematically shows a wear pad assembly for adjusting a position of a wear pad according to embodiment in a cross-sectional view in a first engagement position.

In FIG. 1, a wear pad assembly 10 for adjusting a position for wear pad 16 is shown in a cross-sectional view. The wear pad assembly 10 comprises a threaded boss 12 and a threaded bolt 14 configured to threaded engagement with the threaded boss 12. The wear pad 16 is connected to the threaded bolt 14. In addition, locking means 18 are provided which are configured to lock the threaded boss 12 in the threaded bolt 14 in a first engagement position P1 and at least a further engagement position P2 (not shown in FIG. 1).

The term "locking" may be understood such that a relative movement of the threaded bolt 14 relative to the threaded boss 12 may be prevented. Thereby, rotation relative to the threaded boss, (un)screwing motion and axial movement of the threaded bolt may be prevented.

The term "engagement position" may be understood such that it relates to any position of the threaded bolt 14 relative to the threaded boss 12 in which the threaded bolt 14 threadably engages the threaded boss 12. The first and second engagement positions P1, P2 are not delimited to the second profile 30 engaging in the first or second recesses 21, 21 but rather to an "intended" first and second engagement positions P1, P2 of the threaded bolt 14.

According to the embodiment shown in FIG. 1, the locking means 18 may be configured such that, if the locking means 18 are mounted, the threaded bolt 14 is locked to the threaded boss 12, and if the locking means 18 are not mounted, the threaded bolt 14 is unlocked. In its broadest sense, locking means 18 may comprise components on the threaded boss 12 and components on the threaded bolt 14.

If unlocked, movement of the threaded bolt 14 such as rotation relative to the threaded boss, (un)screwing motion and axial movement is possible. Thereby, the unlocked threaded bolt 14 may be brought from the first engagement position P1 into the second engagement position P2. Once the threaded bolt 14 has reached its further engagement position, it may be locked again by the locking means 18.

To this end, the locking means 18 may comprise a first profile 20 on the threaded boss 12 and a second profile 30 on the threaded bolt 14, wherein the first and second profiles 20, 30 may be complementary. According to the embodiment shown in FIG. 1, the complementary profiles 20, 30 may be configured to form a first positive lock in the first engagement position P1 and a further positive lock in the second engagement position (not shown in FIG. 1).

The first profile 20 may comprise a first recess 21 and at least a further recess 22. The second profile 30 may comprise a protrusion 31. Thereby, the recesses 21-23 of the first profile 20 may allow the protrusion 31 of the second profile 30 to form a positive lock for every recess 21-23 in which the protrusion 31 is engaged. More specifically, the first profile 20 may comprise a total of eight recesses 21-28 (only partly shown in FIG. 1). The recesses may be distributed evenly on the threaded boss 12. The protrusion 31 may protrude from the threaded bolt 14 in a plane orthogonal from an axis of rotation A from the threaded bolt 14.

The first profile 20 may be integral and monolithic with the threaded boss 12. Specifically, the first profile 20 may consist of several recesses 21-23 having a recess height 29. Thereby, the recesses 21-23 allow accommodation of the protrusion 31 along their entire recess height 29.

The second profile 30 may be configured to be releasably mounted to the threaded bolt 14. To this end, the locking means 18 may further comprise a screw 32 configured to releasably mount the second profile 32 with the threaded bolt 14. Further, the locking means 18 may further comprise a washer 34 configured to be mounted to the threaded bolt 14 such that the washer 34 provides the second profile 30.

The threaded bolt 14 may comprise a depression 36 configured to accommodate a mounting portion 38 of the wear pad 16 therein. The wear pad 16 may be configured such that its outer perimeter is equal or smaller than an outer perimeter 44 of the threaded bolt 14. Thereby, the wear pad 16 fits inside the wear pad 16. Further, the wear pad 16 may be fixedly mounted to the threaded bolt 14. Thereby, adjusting the wear pad assembly 10 effects a rotation of the wear pad 16 which allows a more uniform wear formation across the sliding surface 160 of the wear pad 16.

The threaded boss 12 may comprise a first end 120 and a second end 122, wherein the locking means 18 may be provided on the first end 120 and the wear pad 16 may be provided on the second end 122 of the threaded boss 12. According to the embodiment shown in FIG. 1, the first end 120 may face away from a sliding surface 160 of the wear pad 16.

The threaded bolt 14 may be configured such that in a first engagement position P1, the wear pad 16 protrudes from the threaded boss 12 by a first distance D1 and such that in the second engagement position P2, the wear pad 16 protrudes from the threaded boss 12 by a second distance (not shown in FIG. 1). In the context of the present disclosure, the terms first distance D1 (as well as the second distance D2, shown in FIG. 2) may indicate how far the sliding surface 160 protrude beyond the second end 122 of the threaded boss 12.

The threaded boss 12 and the threaded bolt 14 may have a common thread pitch R and may be configured such that a wear pad adjusting step S is equal to the thread pitch R divided by the number of engagement positions P1, P2.

Figure 2:
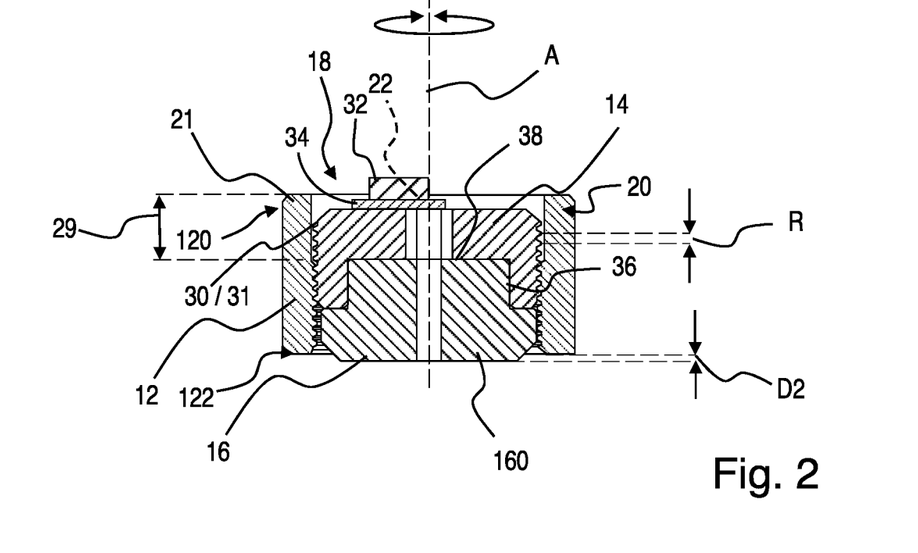
FIG. 2 schematically shows the wear pad assembly according to the embodiment shown in FIG. 1 in the same cross-sectional view as shown in FIG. 1 in a second engagement position.

FIG. 2 schematically shows the wear pad assembly 10 according to the embodiment shown in FIG. 1 in the same cross-sectional view as shown in FIG. 1. FIG. 2 differs from FIG. 1 in that the threaded bolt 14 is in a further engagement position P2.

The working range of the threaded bolt 14 may be delimited along its longitudinal axis A by the recess height 29. The recess height 29 may be configured such that it accommodates the threaded bolt 14 for several full rotations.

Due to the threaded engagement of the threaded boss 12 and the threaded bolt 14, a rotation of the threaded bolt 14 about its longitudinal axis A results in a displacement, or lead, of the threaded bolt 14. If the thread comprises only one thread ridge, the thread lead effected by one full rotation of the threaded bolt is equal to the thread pitch R. With unlocked locking means 18, the threaded bolt 14 may be rotated about its longitudinal axis A. Since adjusting the wear pad assembly 10 requires the threaded bolt 14 to be in an engagement position P1, P2, the adjusting step S, also called adjustment resolution, may be equal to the thread pitch R divided by the number of recesses 21-28, equally distributed on the threaded boss 12.

As an example, for a thread pitch R of 3 mm and a total of eight equally distributed recesses provided on the threaded boss 12, the resulting adjusting step S is +/−0.375 mm. Adjusting the wear pad assembly 10 can therefore be achieved by steps of +/−0.375 mm. According to the illustrations shown in FIGS. 1 and 2, the wear pad assembly 10 in FIG. 2 is adjusted by +0.375 mm (clockwise) relative to the illustration shown in FIG. 1.

Figure 3:
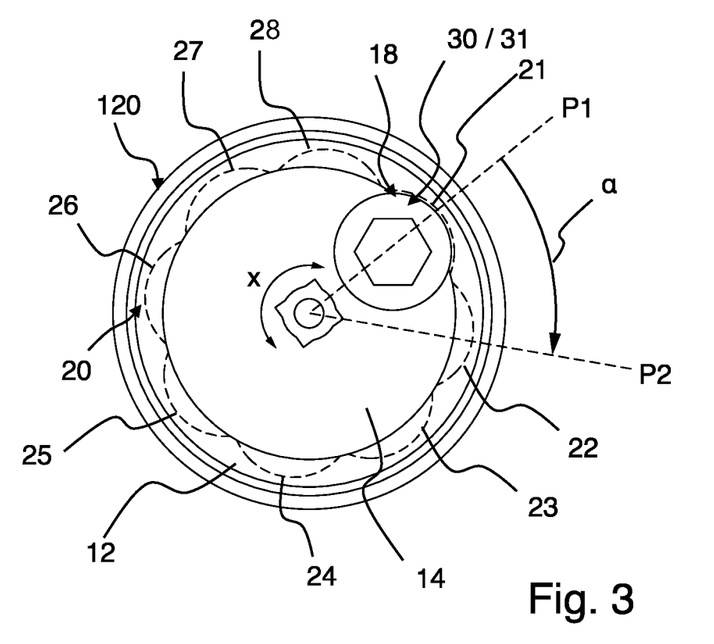
FIG. 3 schematically shows the wear pad assembly according to the embodiments shown in FIG. 1 and FIG. 2 in a top-down view.

FIG. 3 schematically shows the wear pad assembly 10 according to the embodiments shown in FIG. 1 and FIG. 2 in a top-down view. According to the illustration shown in FIG. 3, the locking means 18 are configured to lock the threaded boss 12 and the threaded bolt 14 in a first engagement position P1 and a second engagement position P2. The locking means may comprise a first profile 20 on the threaded boss 12 and a second profile 30 on the threaded bolt, wherein the first and second profiles 20, 30 are complementary.

The complementary profiles 20, 30 may be configured to form a first positive lock in the first engagement position P1 and a further positive lock in the further engagement position P2. To this end, the first profile may comprise a total of eight recesses 21-28 evenly distributed on the threaded boss 12 and the second profile 30 may comprise a protrusion 31. Every recess 21-28 represents a complementary profile for the second profile 30.

The first profile 20 may be integral to and monolithic with the threaded boss 12. The second profile 30 may be configured to be releasably mounted to the threaded bolt 14. Thereby, the threaded bolt 14 can be unlocked, rotated about its longitudinal axis A in an adjusting angle α from the first engagement position P1 to a further engagement position P2-P8. The protrusion 31 of the second profile 30 may be provided by a washer 34 which is part of the locking means 18. The washer 34 may be mounted to the threaded bolt 14 by screw 32. Thereby, the second profile 30 may be configured to be releasably mounted to the threaded bolt 14.

Based on the example provided above for the illustration of FIG. 2, the wear pad 16 (not shown in FIG. 3) may be extended further out by +0.375 mm by the following steps: unlocking the threaded bolt 14 by disassembling the screw 32 and the washer 34, rotating the threaded bolt 14 from the first engagement position P1 into the second engagement position P2 by turning the threaded bolt 14 by an adjusting angle α of +45° (clockwise) to the second engagement position P2, and locking the threaded bolt 14 in the second engagement position P2 by reassembling the disassembled screw 32 and washer 34 when the threaded bolt 14 is in the second engagement position P2.

Likewise, an adjusting of the wear pad assembly based on a full rotation of +360° (clockwise) of the threaded bolt 14 may lead to an extension of the wear pad 16 (not shown in FIG. 1) by +3 mm according to the exemplarily defined thread pitch R.

Figure 4:
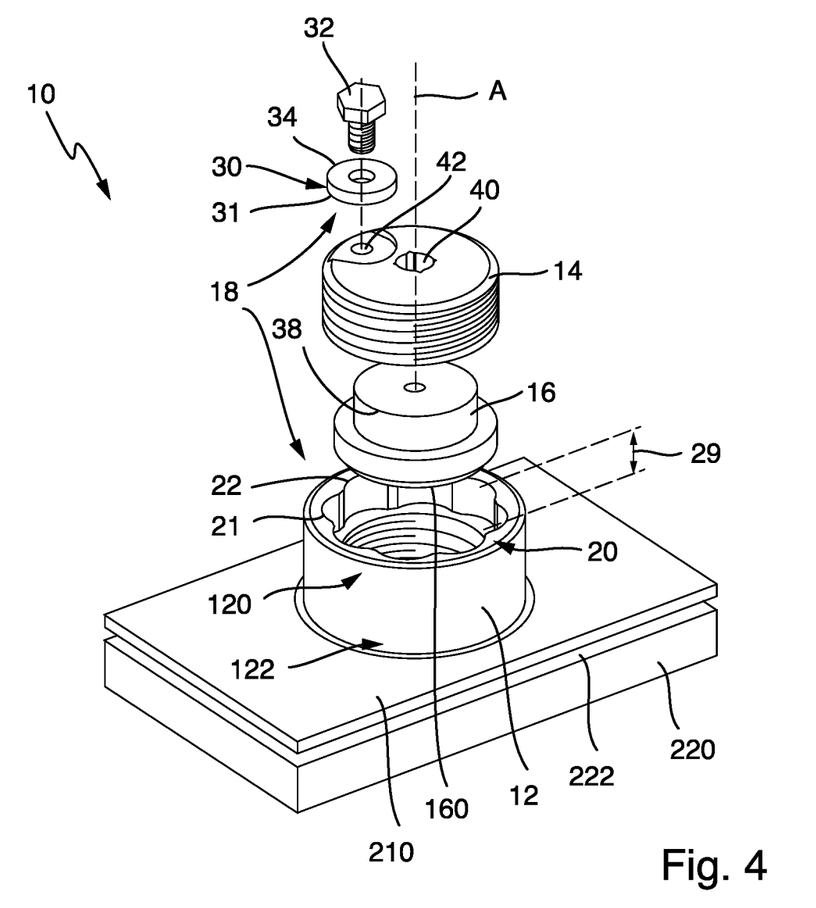
FIG. 4 schematically shows the wear pad assembly according to the embodiment shown in FIGS. 1 to 3 in a perspective, exploded view, mounted to a telescopic boom assembly.

FIG. 4 schematically shows the wear pad assembly 10 according to the embodiment shown in FIGS. 1 to 3 in a perspective, exploded view. FIG. 4 shows the wear pad assembly 10 mounted to a telescopic boom segment 210 which is represented by a simplified plate. Further, a second telescopic boom segment 220 is shown having a running surface 222 for contacting the sliding surface 160 of the wear pad 16.

Assembling the wear pad assembly 10 may be achieved by inserting the mounting portion 38 of the wear pad 16 into the depression 36 of the threaded bolt 14 and by screwing in the threaded bolt to a desired initial position. This initial position may be a position in which the washer 34 is flush with the first end 120 of the threaded boss 12. Preferably, in this initial position, the first distance D1 (not shown in FIG. 4) of the wear pad 16 to the threaded boss 12 may be zero. Adjusting the wear pad assembly 10 may then be achieved by unscrewing the screw 32, removing the washer 34 and by screwing in the threaded bolt 14. Thereto, the threaded bolt 14 may have a square drive hole wrench socket 40 (for a ½" ratchet wrench) in its center to provide a means to drive the threaded bolt 14 in and out of the threaded boss 12. After a rotation of the threaded bolt 14 to a desired further engagement position P2-P8, the washer 34 and the screw 32 may be reassembled to the threaded bolt 14, thereby locking the threaded bolt 14 and the threaded 12 in the desired further engagement position P1-P8. The maximum distance D2 at which the wear pad 16 may protrude from the threaded boss 12 may be reached when the protrusion 31 of the profile 30 of the washer 34 reaches the lower end of the recess height 29.

The locking means 18 according to the present embodiment may prevent loosening of the threaded bolt 14 via the washer 34 that locates in a threaded hole 42 provided on a perimeter 44 of the threaded bolt 14. The washer 34 may engage with any of the complementary recesses 21-28 to prevent rotation.

Figure 5:
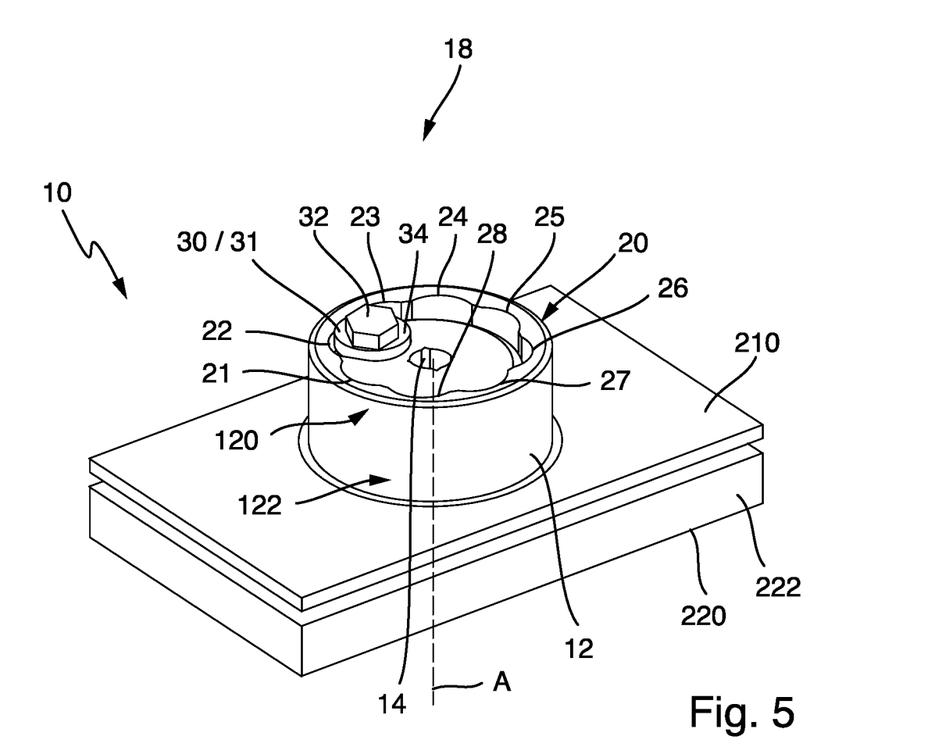
FIG. 5 schematically shows the wear pad assembly according to FIG. 4 in a perspective view, in an assembled state, mounted to a telescopic boom assembly.

FIG. 5 schematically shows the wear pad assembly 10 according to FIG. 4 in a perspective view and in an assembled state mounted to the telescopic boom segment 210. The number of recesses 21-28 and the thread pitch may be tuned to the desired tolerance for a running clearance between the sliding surface 160 of the wear pad 16 and a running surface 222 of the second telescopic boom segment 220. The load path (not shown in FIG. 5) runs through the wear pad, to the threaded bolt 14 and through the threads to the threaded boss 12 and then to the surrounding structure of the first telescopic boom segment 210. The thread size and materials used can be selected as appropriate for the loading of the wear pad.

Figure 6:
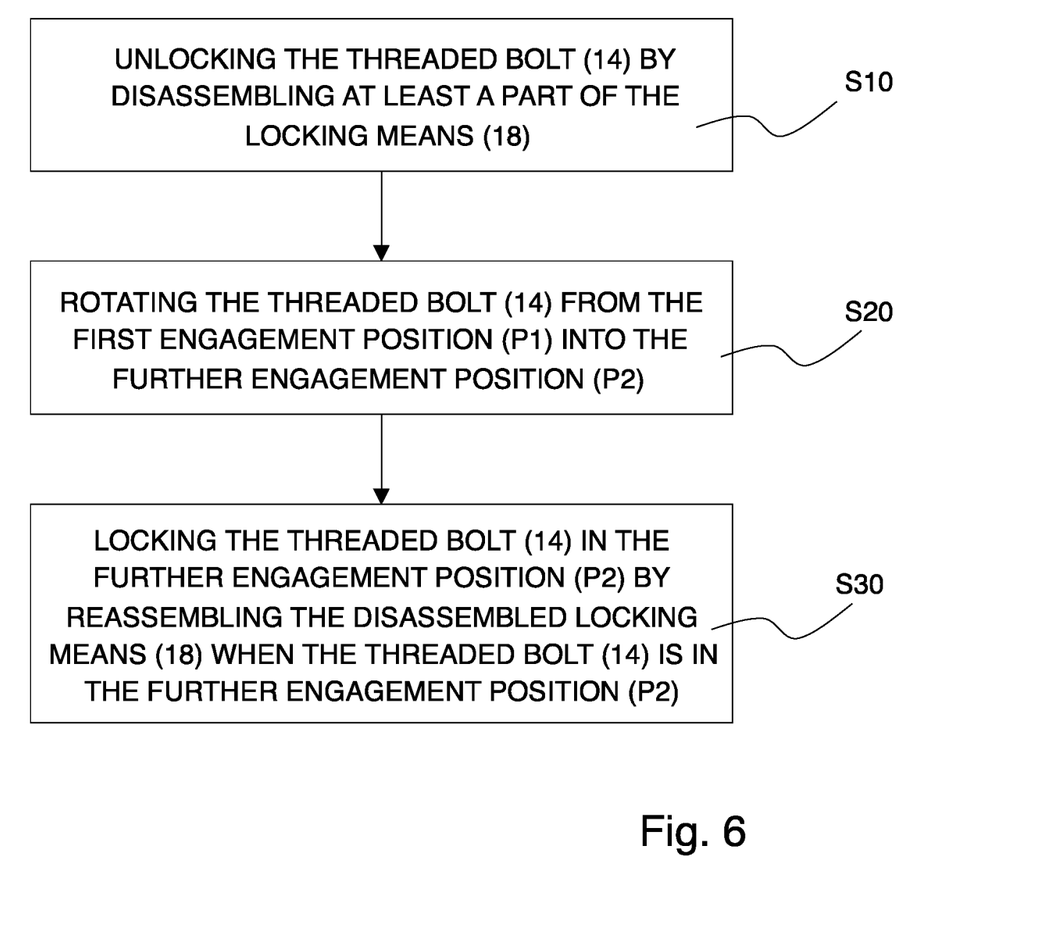
FIG. 6 schematically shows a flow chart of a method for adjusting a wear pad assembly according to an embodiment.

FIG. 6 schematically shows a flow chart of a method for adjusting a wear pad assembly 10 according to a first embodiment. According to this embodiment, the method comprises a wear pad assembly 10 according to the present disclosure being mounted to a first telescopic boom segment 210 such that the wear pad 16 provides a sliding surface 160 for a second telescopic boom segment 220. The method comprises a first step S10 of unlocking the threaded bolt 14 by disassembling at least a part of the locking means 18, a second step of rotating S20 the threaded bolt 14 from the first engagement position P1 into the further engagement position P2, and third step S30 of locking the threaded bolt 14 in the further engagement position P2 and reassembling the disassembled locking means 18 when the threaded bolt 14 is in the further engagement position P2.

Figure 7:
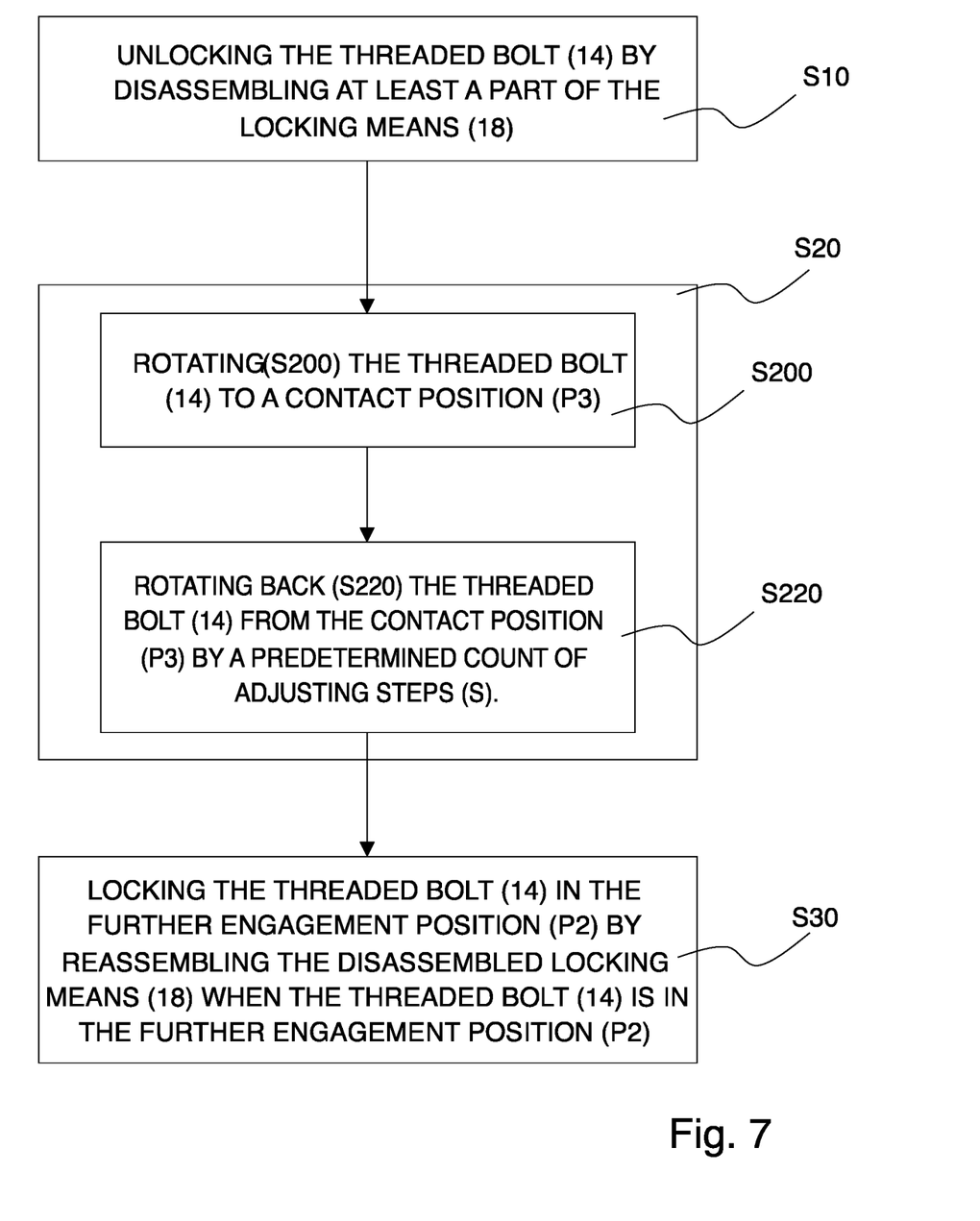
FIG. 7 schematically shows a flow chart of a method for adjusting the wear pad assembly according to a further development of an embodiment.

FIG. 7 schematically shows a flow chart of a method for adjusting the wear pad assembly 10 according to a further development of the first embodiment. According to this development, the step of rotating S20 the threaded bolt 14 from the first engagement position P1 into the further engagement position P2 may further comprise the sub step of rotating S200 the threaded bolt 14 to a contact position P3 in which the sliding surface 160 of the wear pad 16 contacts the second telescopic boom segment 220 and the sub step of rotating back S220 the threaded bolt 14 from the contact position P3 by a predetermined count of adjusting steps S.

By rotating back S220 from the contacting position P3 by a predetermined count of adjusting steps S, a known clearance between the sliding surface 160 of the wear pad to the running surface 222 of the second telescopic boom segment may be achieved without measuring the distance.

For example, if an adjusting step S corresponds to +/−0.375 mm, rotating back the threaded bolt 14 from the contact position P3 by the count of two adjusting steps S, which may be −90° (counterclockwise), a clearance of 0.75 mm between the sliding surface 160 of the wear pad 16 to the running surface 222 of the second telescopic boom segment 220 may be set.

In this way, a reliable yet simple adjusting of a desired clearance between the sliding surface 160 of the wear pad 16 to the running surface 222 of the second telescopic boom segment 220 may be set.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, a wear pad assembly may be configured such that the threaded boss is provided as a screw and the threaded bolt is provided as a threaded boss the wear pad is connectable to a threaded boss instead of A wear pad assembly for adjusting a position of a wear pad in a telescopic boom of a work machine are provided, comprising a threaded boss, a threaded bolt configured for threaded engagement with the threaded boss in a wear pad connectable to the threaded bolt. Further, locking means are provided, configured to lock the threaded boss and the threaded bolt in a first engagement position and at least a further engagement position. To this end, the threaded boss may be a part configured to be fixedly mounted to a telescopic boom of a work machine. Accordingly, the threaded bolt may be configured to be movably accommodated on the inside of the threaded boss.

In the context of the present disclosure, and engagement position may be a position in which the threaded boss and the threaded bolt are in a threaded engagement. Further, in the context of the present disclosure, one engagement position is different to all other engagement positions. The expression "configured to lock the threaded boss and the threaded bolt in a first engagement position and at least a further engagement position" means that the locking means configured to lock the threaded boss and the threaded bolt together in at least two different engagement positions.

In the context of the present disclosure, the term threaded engagement requires that the threaded bolt the threaded boss have a complementary threads. In other words, the threaded bolt and the threaded boss form a conventional threaded engagement. Further, the term threaded engagement according to the present disclosure may relate to a thread having one single thread ridge wrapped around the screw shaft. However, it is also possible that the screws according to the present disclosure may comprise multiple thread ridges wrapped around the screw shaft.

By providing locking means, configured to lock the threaded boss and the threaded bolt in a first engagement position and at least a further engagement position, the wear pad, which is connected to the threaded bolt, can be locked in at least two distinct distances from the threaded boss. This allows adjusting of a wear pad in a telescopic boom of a work machine relative to the threaded bolt which is fixedly mounted to the telescopic boom of the work machine. Thereby, a change in distance between the wear pad and a complementarity sliding surface can be adjusted.

By providing a wear pad connectable to the threaded bolt, the wear pad turns with the threaded bolt. A slight adjustment of a 45° rotation (clockwise/counterclockwise) may effect an adjusting step of +/−0.375 mm of the wear pad. Vice versa, even small adjusting steps may effect substantial rotation of the wear pad sliding surface. Thereby, the wear of the wear pad sliding surface can be distributed in a more uniform way, hence, the lifespan of a wear pad may be increased.

In a further development, the locking means may comprise a first profile on the threaded boss and a second profile on the threaded bolt, wherein the first and second profiles are complementarity. By providing the first and second profiles as complementary profiles, a locking mechanism or locking interaction may be established by means of said complementary profiles. For example, complementary profiles allow a predetermined load path through said complementary profiles. Thereby, predefined adjusting positions may be implemented into the threaded boss and the threaded bolt.

According to a further development, the complementary profiles may be configured to form a first positive lock in the first engagement position and a further positive lock in the further engagement position. By providing a positive lock in each of the engagement positions, locking the threaded boss and the threaded bolt can be guaranteed even if high loads act on the locking surfaces. Thereby, loosening of the threaded bolt from the threaded boss may be prevented. Loosening of the threaded bolt from the threaded boss may be prevented for vibration-induced forces.

In a further development, the first profile may comprise a first recess and at least a further recess and the second profile may comprise a protrusion. The profile provided on the threaded boss may comprise a first recess and at least a further recess and the profile provided on the locking bolt may comprise a protrusion. This has the advantage that the leverage of the actual locking interfaces of the said profiles may be increased, since the engagement radius, at which to complementarity profile surfaces engage with one another may be greater than the outer perimeter of the inner threaded bolt.

Preferably, the first profile may comprise a total of eight recesses. Thereby, a sufficiently fine adjusting step may be realized for widely used thread pitches. At the same time, providing eight recesses still allows providing the first and second profiles at a sufficiently effective shape.

According to a preferred embodiment, the recesses may be evenly distributed on the threaded boss. Thereby, a consistent, predetermined adjusting step may be provided irrespective of the current position of the threaded bolt relative to whether threaded boss.

In a further embodiment, the protrusion may protrude from the threaded bolt in a plane orthogonal from an axis of rotation of the threaded bolt. The axis of rotation may refer to a rotation of the threaded bolt relative to the threaded boss along its translation from a first engagement position to a second engagement position. By providing a protrusion protruding from the threaded bolt in a plane orthogonal from an axis of rotation of the threaded bolt, the first and second mutually complementary profiles may be manufactured and produced in a cost-efficient way and by using standard tools and readily available metal tube and pipe rod materials. Further, assembly and conducting adjusting of the wear pad assembly can be executed and checked easily.

According to a preferred embodiment, the first profile may be integral to and monolithic with the threaded boss. This way, the first profile may be introduced in the threaded boss via an ablative process. By that, structural stability of the threaded boss may be enhanced while at the same time manufacturing costs and manufacturing errors may be minimized.

In a preferred embodiment, the second profile may further comprise a screw configured to be releasably mounted to the threaded bolt. Thereby, changing the bolt from a first engagement position to a second engagement position may be achieved conveniently a growing on or unscrewing the screw. In other words, changing the threaded bolt from a first engagement position to a second locked engagement position may comprise loosening the second profile from the threaded bolt, screwing or unscrewing the threaded bolt along its threaded engagement with the threaded boss until a second locking engagement position is reached, and mounting the second profile again such that the threaded bolt is secured to the threaded boss in a locked engagement position.

They further development, the locking means may further comprise a washer configured to be mounted to the threaded bolt, such that the washer may provide the second profile.

According for further development, the threaded bolt may comprise a depression configured to accommodate a mounting portion of the wear pad therein.

In a further development, threaded boss may comprise a first end and a second end, wherein the locking means are provided on the first end and the wear pad may be provided on the second end of the threaded boss.

According to embodiments of the present disclosure, the threaded bolt may be configured such that in a first engagement position wear pad protrudes from the threaded boss by a first distance such that in the second engagement position wear pad protrudes from the threaded boss by a second distance. Thereby, a correlation between adjusting angle and change in distance of the wear pad to the threaded boss may be established, allowing to predict or set a desired change of a wear pad position.

According to a further development, the threaded boss and the threaded bolt may have a common thread pitch and are configured such that a wear pad adjusting step is equal to the thread pitch divided by the number of engagement positions, preferably wherein the threaded pitch is 3 mm and adjusting of the threaded bolt from a first engagement position to a further engagement position corresponds to an adjusting step of +/−0.375 mm. By providing the threaded boss and the threaded bolt such that a wear pad adjusting step is equal to the thread pitch divided by the number of engagement positions, an easy to use adjusting mechanism may be provided. By providing a thread pitch of 3 mm, a readily available thread pitch may be utilized. Further, by providing an adjusting step of step of +/−0.375 mm, a total of eight locking positions may be provided, corresponding to an adjusting angle of 45°, which is easy to adjust, monitor and check.

A method for adjusting a wear pad assembly according to a first embodiment may be provided, comprising a wear pad assembly according to the present disclosure mounted to a first telescopic boom segment such that the wear pad provides a sliding surface for a second telescopic boom segment. The method comprises the steps of unlocking the threaded bolt by disassembling at least a part of the locking means, rotating the threaded bolt from the first engagement position into the further engagement position and locking the threaded bolt in the further engagement position by reassembling the disassembled locking means when the threaded bolt is in the further engagement position.

Thereby, the wear pad assembly may be locked, adjusted and locked again in further locked position. This allows adjusting of a wear pad in a telescopic boom of a work machine relative to the threaded bolt which is fixedly mounted to the telescopic boom of the work machine. Thereby, a change in distance between the wear pad and a complementarity sliding surface can be adjusted.

According to a further development, the step of rotating the threaded bolt from the first engagement position into the further engagement position may comprise the sub steps of rotating the threaded bolt to a contact position in which the sliding surface of the wear pad contacts the second telescopic boom segment and rotating back the threaded bolt from the contact position by a predetermined count of adjusting steps.

By rotating back from the contacting position by a predetermined count of adjusting steps, a desired, predetermined clearance between the sliding surface of the wear pad to the running surface of the second telescopic boom segment may be achieved without measuring the distance.

For example, if an adjusting step S corresponds to +/−0.375 mm, rotating back the threaded bolt from the contact position by the count of two adjusting steps S, a clearance of 0.75 mm between the sliding surface of the wear pad to the running surface of the second telescopic boom segment may be set.

INDUSTRIAL APPLICABILITY

With reference to the Figures, a wear pad assembly for adjusting a position of a wear pad in a telescopic boom of a work machine and a method for adjusting a wear pad assembly are applicable in any suitable work machine, for example a telehandler.

In practice, a wear pad assembly for adjusting a position of a wear pad in a telescopic boom may be manufactured, bought, or sold to retrofit a telescopic boom segment, a telescopic boom assembly, or a work machine already deployed in the field in an aftermarket context, or alternatively may be manufactured, bought, sold or otherwise obtained in an OEM (original equipment manufacturer) context.

As alluded to previously herein, the aforementioned embodiments may increase the improve the reliability and performance as will be elaborated further herein momentarily.

Referring to FIG. 1, there is an embodiment showing a wear pad assembly for adjusting a position of the wear pad in a telescopic boom of a work machine is provided, comprising a threaded boss, a threaded bolt configured for threaded engagement with the threaded boss in a wear pad connectable to the threaded bolt. Further, locking means are comprised configured to lock the threaded boss and the threaded bolt in a first engagement position and at least a further engagement position.

One skilled in the art will expect that various embodiments of the present disclosure will have an improved simplicity, more cost-effective wear pad assembly providing a simple, cost-effective wear-pad assembly for adjusting a position of the wear pad in a telescopic boom of a work machine.

Referring to FIG. 6, there is a method of adjusting of a wear pad assembly disclosed, comprising a wear pad assembly according to the present disclosure mounted to a first telescopic boom segment such that the wear pad provides a sliding surface for a second telescopic boom segment. The method comprises the steps of unlocking the threaded bolt by disassembling at least a part of the locking means, rotating the threaded bolt from the first engagement position into the further engagement position and locking the threaded bolt in the further engagement position by reassembling the disassembled locking means when the threaded bolt is in the further engagement position.

One skilled in the art will expect that various embodiments of the present disclosure will have an improved simplicity, more cost-effective method of adjusting a wear pad assembly by providing a simple, cost-effective method for adjusting a position of the wear pad in a telescopic boom of a work machine.

Referring to FIG. 7, a development of the method is disclosed, comprising the sub steps of rotating the threaded bolt to a contact position in which the sliding surface of the wear pad contacts the second telescopic boom segment and rotating back the threaded bolt from the contact position by a predetermined count of adjusting steps.

One skilled in the art will expect that various embodiments of the present disclosure will have an improved simplicity, more cost-effective method of adjusting a wear pad according to a predetermined clearance between the wear pad and the adjacent telescopic boom segment.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise. Further, coordinate axes are intended to be exemplary only without delimiting the scope of the disclosure.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of values or dimensions herein are merely intended to serve as a shorthand method of referring individually to each separate value falling within the range, unless otherwise indicated herein, and each separate value is incorporated into the specification as if it were individually recited herein.

Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A wear pad assembly for adjusting a position of a wear pad in a telescopic boom of a work machine, comprising:
a threaded boss;
a threaded bolt configured for threaded engagement with the threaded boss and the wear pad connectable to the threaded bolt;
a locking mechanism configured to lock the threaded boss and the threaded bolt in a first engagement position and at least a further engagement position, the locking mechanism including a plurality of radial outwardly extending curvilinear recesses provided in the threaded boss, and a washer mounted on the threaded bolt, the washer being shaped complementarily to the plurality of recesses.

2. The wear pad assembly according to claim 1, wherein the the threaded boss includes a total of eight recesses.

3. The wear pad assembly according to claim 2, wherein the recesses are evenly distributed on the threaded boss.

4. The wear pad assembly according to claim 1, wherein the washer protrudes from the threaded bolt in a plane orthogonal from an axis of rotation of the threaded bolt.

5. The wear pad assembly according to claim 1, wherein the plurality of recesses are integral to and monolithic with the threaded boss.

6. The wear pad assembly according to claim 1, wherein the washer is configured to be releasably mounted to the threaded bolt.

7. The wear pad assembly according to claim 6, wherein the locking mechanism further comprise a screw configured to releasably mount the washer to the threaded bolt.

8. The wear pad assembly according to claim 1, wherein the threaded bolt comprises a depression configured to accommodate a mounting portion of the wear pad therein.

9. The wear pad assembly according to claim 1, wherein the threaded boss comprises a first end and a second end, wherein the locking mechanism are provided on the first end and the wear pad is provided on the second end of the threaded boss.

10. The wear pad assembly according to claim 1, wherein the threaded bolt is configured such that in a first engagement position the wear pad protrudes from the threaded boss by a first distance and such that in the second engagement position the wear pad protrudes from the threaded boss by a second distance.

11. The wear pad assembly according to claim 1, wherein the threaded boss and the threaded bolt have a thread pitch and are configured such that a wear pad adjusting step is equal to the thread pitch divided by the number of engagement positions, wherein the threaded pitch is 3 mm and adjusting of the threaded bolt from a first engagement position to a further engagement position corresponds to an adjusting step of +/−0.375 mm.

12. A method of adjusting a wear pad assembly according to claim 1, the wear pad assembly being mounted to a first telescopic boom segment such that the wear pad provides a sliding surface for a second telescopic boom segment, the method comprising the steps of:
unlocking the threaded bolt by disassembling at least a part of the locking mechanism;
rotating the threaded bolt from the first engagement position into the further engagement position, locking the threaded bolt in the further engagement position by reassembling the disassembled locking mechanism when the threaded bolt is in the further engagement position.

13. The method for adjusting a wear pad according to claim 12, wherein the step of rotating the threaded bolt from the first engagement position into the further engagement position comprises the sub steps of rotating the threaded bolt to a contact position in which the sliding surface of the wear pad contacts the second telescopic boom segment; and rotating back the threaded bolt from the contact position by a predetermined count of adjusting steps.

* * * * *